United States Patent
Matoba et al.

(10) Patent No.: US 6,906,753 B1
(45) Date of Patent: Jun. 14, 2005

(54) IMAGE PROCESSING UNIT AND IMAGE PROCESSING METHOD WITH SIMPLIFIED EXPOSURE, GAIN AND WHITE BALANCE CONTROL

(75) Inventors: Narihiro Matoba, Tokyo (JP); Kazuto Terada, Tokyo (JP); Masashi Tamura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/337,494

(22) Filed: Jun. 22, 1999

(30) Foreign Application Priority Data

Jun. 23, 1998 (JP) .......................................... 10-176418

(51) Int. Cl.[7] ........................ H04N 5/235; H04N 5/238; G06K 9/36
(52) U.S. Cl. ...................... 348/362; 348/364; 382/245; 382/246
(58) Field of Search ................................ 348/362–366, 348/234–236, 410.1; 375/246, 253, 240.23; 382/245, 246

(56) References Cited

U.S. PATENT DOCUMENTS

| | | | | |
|---|---|---|---|---|
| 5,027,214 A | * | 6/1991 | Fujimori | 348/231.7 |
| 5,032,927 A | * | 7/1991 | Watanabe et al. | 375/240.24 |
| 5,295,077 A | * | 3/1994 | Fukuoka | 348/231.6 |
| 5,384,644 A | * | 1/1995 | Yamagami | 348/384.1 |
| 5,414,487 A | * | 5/1995 | Iwasaki | 396/234 |
| 6,101,282 A | * | 8/2000 | Hirabayashi et al. | 382/246 |
| 6,459,816 B2 | * | 10/2002 | Matsuura et al. | 382/248 |
| 6,512,791 B1 | * | 1/2003 | Takayama | 375/240.01 |
| 2002/0102027 A1 | * | 8/2002 | Miyake et al. | 382/239 |
| 2003/0138151 A1 | * | 7/2003 | Schwartz | 382/239 |

FOREIGN PATENT DOCUMENTS

JP    A4 298170    10/1992

* cited by examiner

*Primary Examiner*—Thai Tran
*Assistant Examiner*—Lin Ye
(74) *Attorney, Agent, or Firm*—Birch, Stewart, Kolasch & Birch, LLP

(57) ABSTRACT

An image processing unit is provided which can solve a problem of a conventional image processing unit in that the control for coding image data is complicated and its circuit scale is large. The image pickup apparatus picks up an image of a subject and converts it to electric signals, thereby outputting image signals. An A/D converter A/D converts the image signals, and outputs them as image data. A fixed length coding circuit breaks down the image data into small unit blocks consisting of a predetermined number of pixels, and carries out fixed length coding after obtaining the average level of the pixel data in each unit block. An exposure controller calculates a luminance level of a whole set of pixel data in the unit blocks, and controls the exposure of the image pickup apparatus so that image data becomes a predetermined luminance level.

40 Claims, 16 Drawing Sheets

IMAGE PROCESSING UNIT AND IMAGE PROCESSING METHOD WITH SIMPLIFIED EXPOSURE, GAIN AND WHITE BALANCE CONTROL

BACKGROUND OF THE INVENTION

1. Field of the Invention

The present invention relates to an image processing unit and image processing method of a digital still video camera that carries out exposure control, gain control and white balance control using coded data formed by coding image signals output from an image pickup apparatus.

2. Description of Related Art

Japanese patent application laid-open No. 4-298170/1992 discloses a technique about a digital still video camera with a function of coding, through orthogonal transformation, image signals acquired by an image pickup device such as a CCD (charge-coupled device). This technique utilizes DC (direct current) component data obtained by the orthogonal transformation in order to control exposure.

FIG. 16 is a block diagram showing a configuration of a digital still video camera disclosed in the above-mentioned Japanese patent application laid-open No. 4-298170. In FIG. 16, the reference numeral 101 designates a diaphragm for spatially controlling the amount of light entering the camera; 102 designates a shutter for temporally controlling the amount of the incident light; 103 designates a CCD for converting the received incident light to electrical signals; 104 designates a Y/C separator for generating from the image signals output from the CCD 103 a luminance component and color components to be output separately; 105 designates a CCD driver for supplying the CCD 103 with drive signals for driving it; 106 designates an A/D converter for converting the analog luminance signal and the color signals output from the Y/C separator 104 into digital image data; 107 designates a high-speed buffer memory for temporarily storing the image data output from the A/D converter 106; 108 designates a data compressor/decompressor that reads from the high-speed buffer memory 107 the image data, divides the image data of an amount of a single screen into a plurality of blocks, and carries out data compression by coding through quantization of frequency information obtained by orthogonal transformation of each block, or data expansion by the reverse transformation; 109 designates a recording memory for recording the data compressed image data through the data compressor/decompressor 108; 110 designates a D/A converter for converting the image data read from the high-speed buffer memory 107 into an analog signal; and 111 designates a system controller that supplies the foregoing blocks with timing signals for controlling their operation, and outputs controlling signals for controlling the diaphragm 101 and the shutter 102 by reading as photometric data the DC component data of each block after the orthogonal transformation in the data compression process in the data compressor/decompressor 108.

Next, the operation of the conventional digital still video camera will be described.

In this conventional digital still video camera, the system controller 111 reads block by block the DC component data of each block after the orthogonal transformation in the data compression process by the data compressor/decompressor 108, and carries out the exposure control by controlling the driving of the diaphragm 101 and the shutter 102 by using the read data as the photometric data, thereby achieving the right exposure to a subject of the camera.

The conventional image processing unit with the foregoing structure employs the orthogonal transformation as its coding scheme. Thus, calculating and coding the photometric data on the real time basis requires a real time processing of a series of coding sequences. This, however, has a problem of complicating the control and increasing the circuit scale because the orthogonal transformation coding is one of the variable length coding methods.

Furthermore, to use the photometric data to implement gain correction of the digital data of the picked-up image, it is necessary to hold besides the coded data the DC components, or to regenerate the DC components by decoding the coded data, which presents a problem of increasing the processing procedure.

In addition, since the gain correction of the digital data obtained by coding the picked-up image cannot be provided directly to the coded data, the coded data must be decoded once, and then subjected to the sequential processing. This presents another problem of hindering the high speed processing.

Moreover, since the coding based on the orthogonal transformation is one of the variable length coding methods, the control such as calculating addresses for reading the coded data during the decoding becomes complicated, and this presents a problem of reducing the processing speed and increasing the circuit scale.

Furthermore, coding into a single color signal component the image output from the image pickup device, which includes a plurality of color filters, poses a problem of degrading the accuracy of the photometric data. This is because the color modulation components are each processed as a resolution component, which increases the quantization error due to the coding.

In addition, it is necessary for the white balance processing, which corrects sensitivity errors in individual colors of the image output from the image pickup device including a plurality of color filters, to have coding circuits of the number of the color components; and this presents a problem of increasing the circuit scale.

Moreover, to select a block used for determining the photometric data in desired conditions, it is necessary for the processing of deciding the conditions to utilize data in the process of coding rather than the coded data themselves. This presents another problem of increasing the processing procedure.

Finally, to select a block used for determining the photometric data in desired conditions, the block to be used for generating the photometric data cannot be selected by a simple processing because the processing, which carries out the gain correction of the digital data obtained by coding the picked-up image, employs the variable length coding. This presents still another problem of complicating the processing.

SUMMARY OF THE INVENTION

The present invention is implemented to solve the foregoing problems. It is therefore an object of the present invention to provide an image processing unit capable of achieving a real-time processing of a series of coding sequences with a simple control and a small circuit scale.

Another object of the present invention is to provide an image processing unit capable of implementing the gain correction using the coded data with a simple processing by generating only from the coded data the photometric data used for the gain correction of the digital image picked-up data, without holding the photometric data in addition to the coded data.

Still another object of the present invention is to provide an image processing unit capable of implementing the high-speed gain correction which uses the coded data by directly applying the gain correction of the digitally coded picked-up image data to the coded data.

Another object of the present invention is to provide an image processing unit capable of facilitating the control such as calculation of the addresses for reading the coded data during decoding.

Still another object of the present invention is to provide an image processing unit capable of improving the accuracy of the photometric data by reducing the quantization errors involved in coding the output image of the image pickup device including a plurality of color filters because the color modulation components are processed as a resolution component.

Another object of the present invention is to provide an image processing unit capable of achieving, with a small circuit scale, the white balance processing for correcting sensitivity errors in individual colors of the image output from the image pickup device which includes the plurality of color filters, without using coding circuits of the number of the color components.

Still another object of the present invention is to provide an image processing unit capable of reducing the processing procedure to select a block used for determining the photometric data in desired conditions, by using the coded data themselves to decide the conditions.

Another object of the present invention is to provide an image processing unit capable of determining, when selecting a block to be used for generating the photometric data, the block used for generating the photometric data with simplifying the processing of carrying out the gain correction of the digitally coded picked-up image.

According to a first object of the present invention, there is provided an image processing unit comprising: an A/D converter for carrying out A/D conversion of image signals output from an image pickup apparatus that picks up an image and converts it into electrical signals, and for outputting A/D converted image signals as image data; a fixed length coding circuit for dividing the image data into unit blocks, each consisting of a predetermined number of pixels, and for coding the pixels in each unit block after obtaining an average level of the pixels in the unit block; and an exposure controller for calculating a luminance level of a whole set of pixel data in the unit blocks by integrating the average levels of the unit blocks, and for controlling exposure of the image pickup apparatus such that the luminance level of the image data matches a predetermined level.

Here, the image processing unit may further comprise a coded image memory for storing fixed length coded data output from the fixed length coding circuit, the fixed length coded data including the average levels of the unit blocks.

The image processing unit may further comprise a fixed length decoding circuit for reading from the coded image memory the fixed length coded data, for calculating a luminance level of the image data from the average levels, and for carrying out fixed length decoding of the fixed length coded data with performing gain correction for adjusting the luminance level of the image data to a predetermined level.

The image processing unit may further comprising: a fixed length decoding circuit for reading from the coded image memory the fixed length coded data, and for carrying out fixed length decoding of the fixed length coded data; and a signal processor for carrying out, using the average levels, gain correction of image data output from the fixed length decoding circuit.

According to a second aspect of the present invention, there is provided an image processing unit comprising: an A/D converter for carrying out A/D conversion of image signals output from an image pickup device that picks up an image and converts it into electrical signals including a plurality of color components, and for outputting A/D converted image signals as image data; a pixel rearrangement circuit for sorting the image data output from the A/D converter such that each color component is arranged in a unit block, each of which consists of a predetermined number of pixels; and a fixed length coding circuit for coding the pixels in each unit block after obtaining an average level of the pixels in the unit block.

Here, the image processing unit may further comprise an exposure controller for calculating a luminance level of a whole set of pixel data in the unit blocks by integrating the average levels of the unit blocks, and for controlling exposure of the image pickup apparatus such that the luminance level of the image data matches a predetermined level.

The image processing unit may further comprise signal level correction means for correcting, using the average levels of the unit blocks, relative signal levels of the respective color components.

The image processing unit may further comprise a coded image memory for storing fixed length coded data including the average level of each unit block, the fixed length coded data being output from the fixed length coding circuit.

The signal level correction means may read from the coded image memory the average levels, calculate from the average levels luminance levels of the pixel data in the unit blocks of the respective color components, and correct signal levels of the color components such that the luminance levels of the color components match with each other.

The image processing unit may further comprise a fixed length decoding circuit for reading from the coded image memory the fixed length coded data, and for carrying out fixed length decoding of the fixed length coded data with performing gain correction for adjusting, for each color component, the luminance level of the image data to a predetermined level by using the average levels.

The image processing unit may further comprise: a fixed length decoding circuit for reading from the coded image memory the fixed length coded data, and for carrying out fixed length decoding of the fixed length coded data; and a signal processor for carrying out, for each color component, signal level correction of image data output from the fixed length decoding circuit by using the average levels.

The image processing unit may further comprise selecting means for selecting a number of the unit blocks.

The image processing unit may further comprise selecting means for selecting a location of the unit blocks.

The image processing unit may further comprise selecting means for selecting the unit blocks in accordance with their average levels.

According to a third aspect of the present invention, there is provided an image processing method of reproducing a picked-up still image, the method comprising the steps of: carrying out A/D conversion of image signals output from an image pickup apparatus, and for outputting A/D converted image signals as image data; dividing the image data into unit blocks, each consisting of a predetermined number of pixels, and coding the pixels in each unit block after obtaining an average level of the pixels in the unit block; and calculating a luminance level of a whole set of pixel data in the unit blocks by integrating the average levels of the unit blocks, and controlling exposure of the image pickup apparatus such that the luminance level of the image data matches a predetermined level.

DETAILED DESCRIPTION OF THE PREFERRED EMBODIMENTS

The invention will now be described with reference to the accompanying drawings.

Embodiment 1

Figure 1:
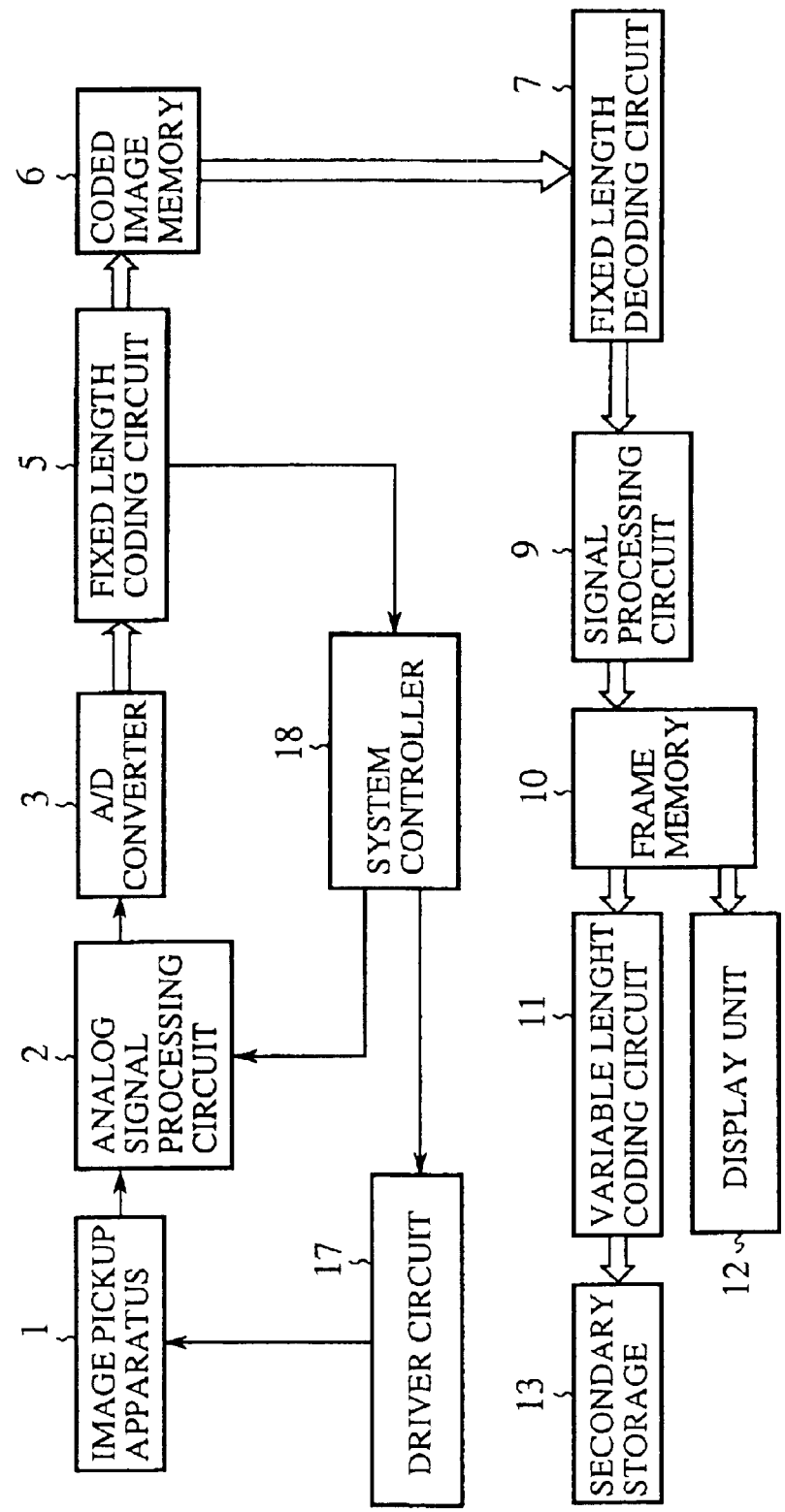
FIG. 1 is a block diagram showing an embodiment 1 of an image processing unit in accordance with the present invention.

FIG. 1 is a block diagram showing an embodiment 1 of an image processing unit in accordance with the present invention. In FIG. 1, the reference numeral 1 designates an image pickup apparatus including a one-chip image pickup device such as a CCD that includes color filters with a plurality of colors, and outputs pixel signals in a dot serial manner; 2 designates an analog signal processing circuit comprising a filtering circuit, and an amplifier for amplifying analog image signals output from the image pickup apparatus 1 to carry out exposure control; 3 designates an A/D converter for converting analog signals output from the analog signal processing circuit 2 into digital signals; 5 designates a fixed length coding circuit for performing a fixed length coding of the digital image data on a block by block basis of the color signals output from the A/D converter 3, the coding being one of FBTC (fixed block truncation coding) schemes; 6 designates a coded image memory for storing coded data output from the fixed length coding circuit 5; 17 designates a driver circuit for controlling the exposure time of the image pickup device of the image pickup apparatus 1 for carrying out exposure control; and 18 designates a system controller for controlling the analog signal processing circuit 2 and the driver circuit 17 in accordance with the coded data output from the fixed length coding circuit 5.

The reference numeral 7 designates a fixed length decoding circuit for carrying out fixed length decoding by reading the coded data from the coded image memory 6; 9 designates a signal processing circuit for performing, on the image data decoded by the fixed length decoding circuit 7, pixel interpolation, gray level correction, gamma correction and the like; 10 designates a frame memory for storing signals corrected by the signal processing circuit 9; 11 designates a variable length coding circuit for coding, for secondary storage, data read from the frame memory 10 using a variable length coding scheme like JPEG (Joint Photographic Experts Group) schemes; 12 designates a display unit 12 like a CRT for displaying data read from the frame memory 10 as an image; and 13 designates a secondary storage such as a floppy disk, hard disk or flash memory.

Next, the operation of the present embodiment 1 will be described.

A fundamental processing of a common AE (Auto-Exposure) for controlling the exposure of the image pickup device in the image pickup apparatus 1 is carried out by setting pickup conditions such that the luminance level of the picked-up image matches a predetermined level. The luminance level of the image is obtained by integrating the image signals. To achieve the integration digitally, it is necessary to sequentially accumulate the A/D converted image data over a predetermined number of pixels.

Figure 2:
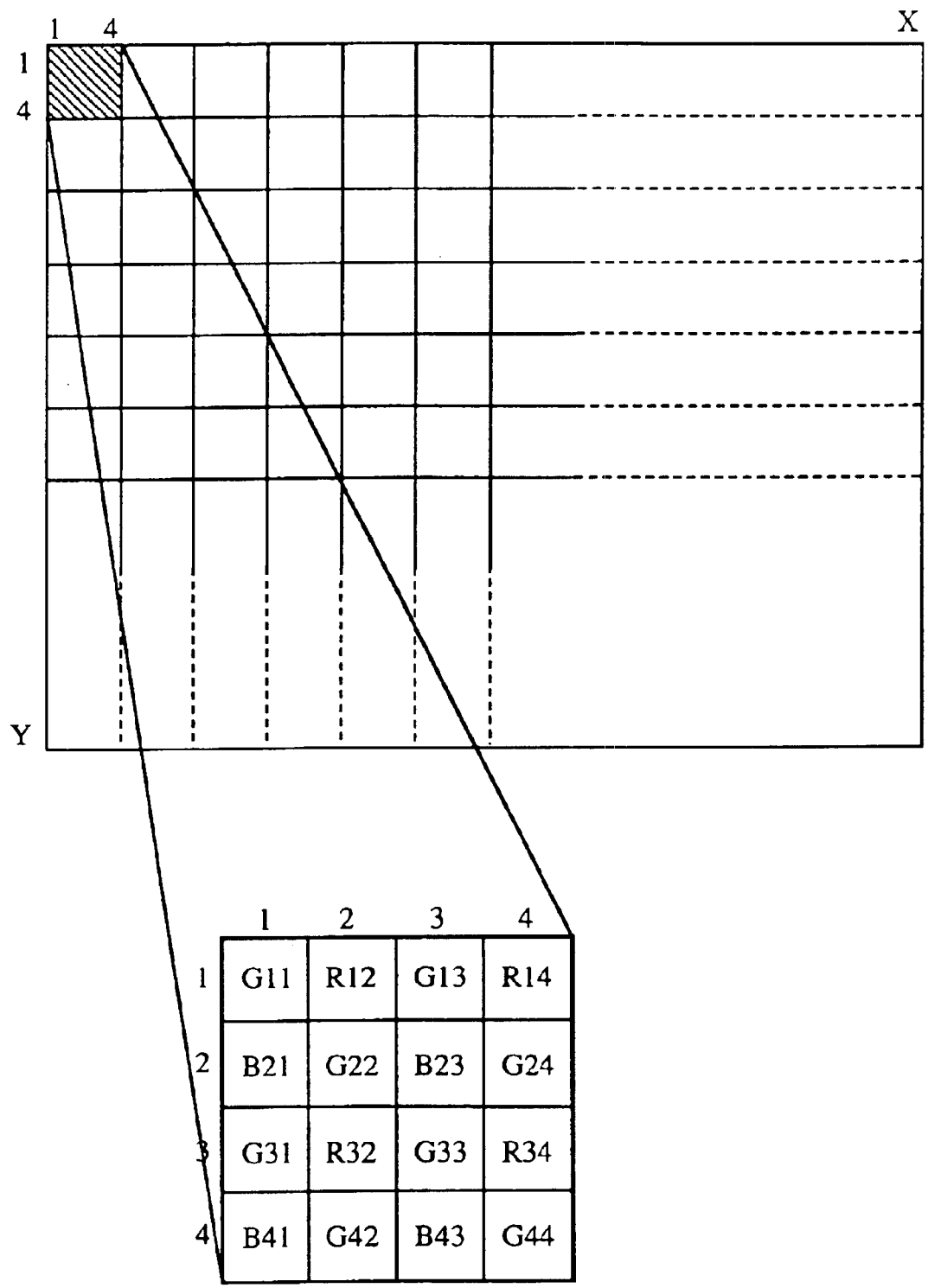
FIG. 2 is a diagram showing an arrangement of color filters used by the image pickup device of the embodiment 1.

In the present embodiment 1, the image pickup apparatus 1 captures images of a subject with its pickup device, and outputs, pixel by pixel in the scanning direction in a dot-serial manner, image signals corresponding to incident light filtered through the color filters. The color image signals are amplified by the analog signal processing circuit 2, and subjected to filtering for removing noise components. The image signals are converted into digital signals through the A/D converter 3, and are output as digital image data. The fixed length coding circuit 5 carries out the fixed length coding of the digital image data on a block by block basis consisting of 4 by 4 pixels, that is, the total of 16 pixels as shown in FIG. 2. The unit block includes the three colors RGB in a mixed state, and the fixed length coding is carried out in this state.

Figure 3:
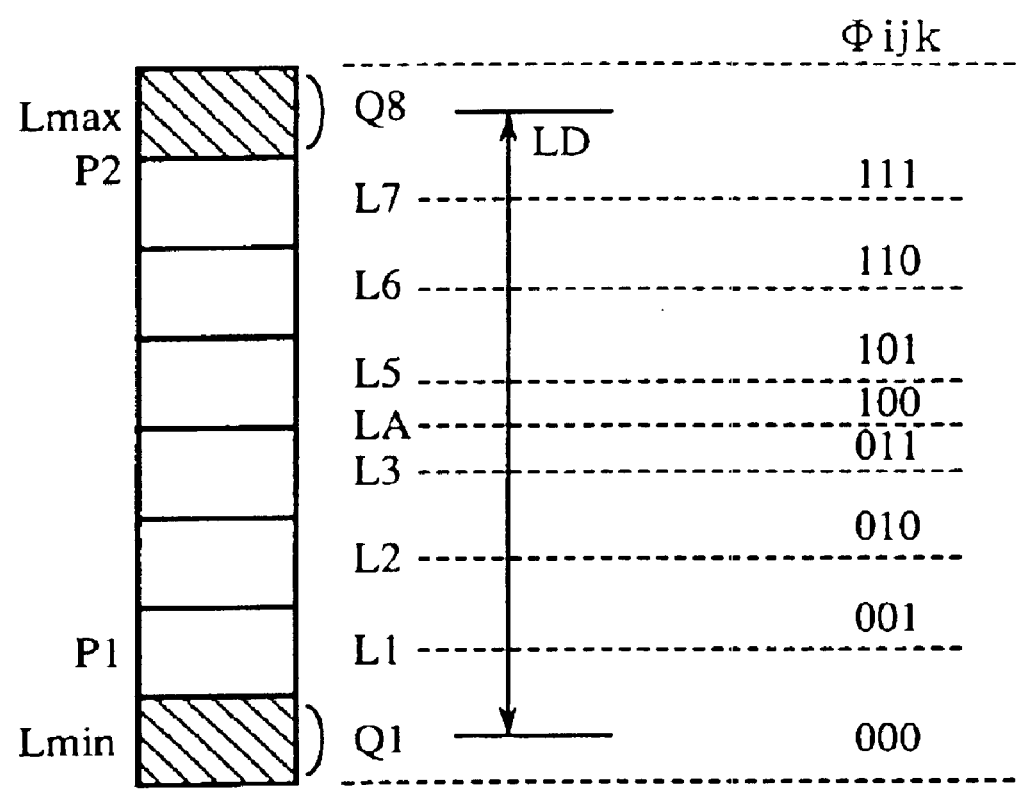
FIG. 3 is a diagram illustrating quantization levels for scaling the intensity of image signals of each pixel with a fixed length coding circuit.

FIG. 3 illustrates quantization levels for the fixed length coding circuit 5 to quantize the intensity of image signals of each pixel. In FIG. 3, Lmin is a minimum value of the image signal intensity in the 16 pixels as shown in FIG. 2, Lmax is a maximum value of the image signal intensity in the same 16 pixels, P1 is a value at the bottom one of eight equal divisions between the maximum value Lmax and the minimum value Lmin, P2 is a value at the top one of the eight divisions, Q1 is the average value of the pixels with the intensity equal to or greater than Lmin and equal to or less than P1, and Q8 is the average value of pixels with the intensity equal to or less than Lmax and greater than P2.

The symbol LD is a gray scale width indicator in the unit block, which is equal to Q8−Q1, and L1–L7 are subdivisions of the gray scale width indicator LD, which are obtained by dividing the indicator by a factor of 8, and arranged in ascending order. The symbol LA is the average level of the image data in the unit block, and is equal to (Q1+Q8)/2, and φ ijk represents the quantization level of each pixel.

Figure 4:
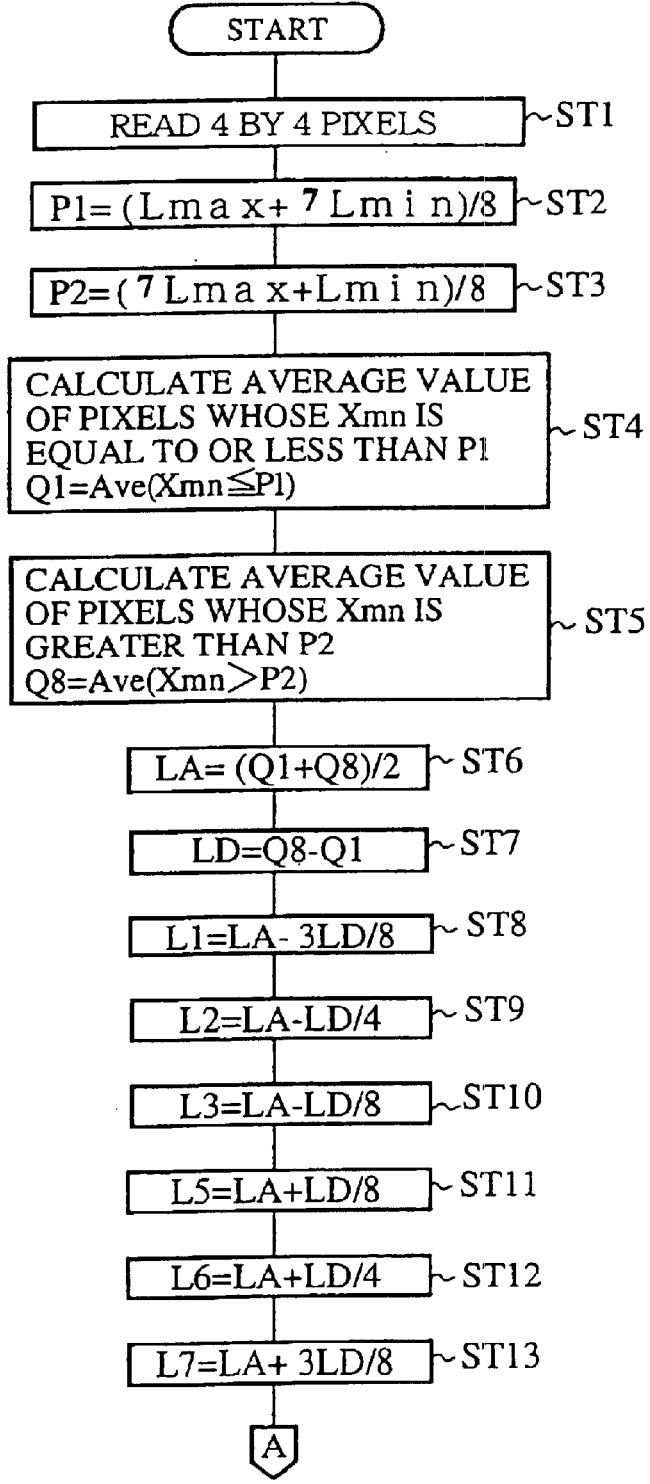
FIGS. 4 and 5 are a flowchart showing a coding procedure of the embodiment 1.
Figure 5:
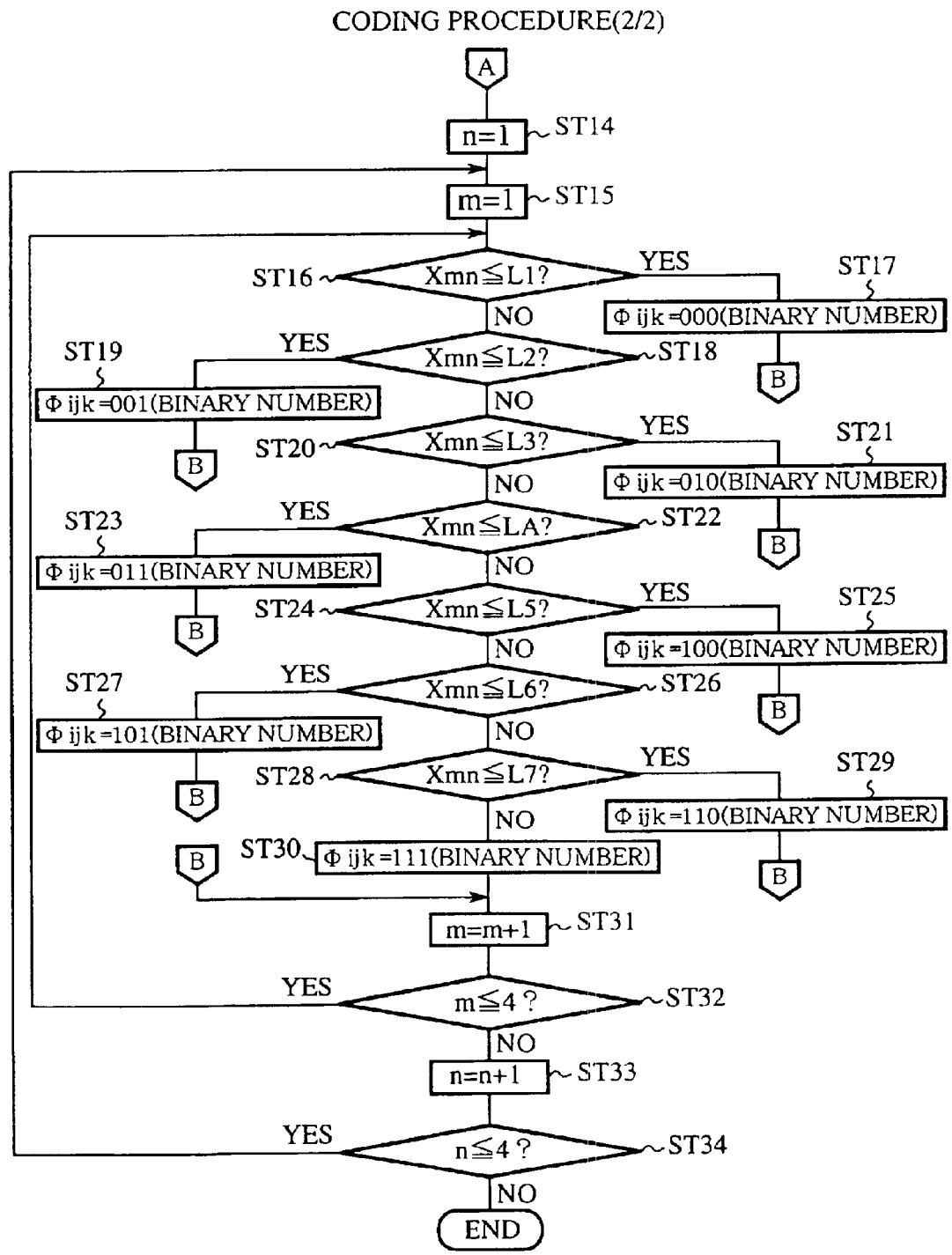

FIGS. 4 and 5 are a flowchart showing a coding procedure of the embodiment 1. The coding procedure will be described with reference to the flowchart.

First, the fixed length coding circuit 5 reads the image data in a unit block which is converted into the digital form through the A/D converter 3 (step ST1). Then, the fixed length coding circuit 5 calculates the signal intensity of the image data of the 4×4 pixels, and successively obtains the values P1, P2, Q1, Q8, LA, LD, L1–L3 and L5–L7 (steps ST2–ST13) using the following equations.

P1=(Lmax+7Lmin)/8
P2=(7Lmax+Lmin)/8
Q1=Ave(Xmn≦P1)
Q8=Ave(Xmn >P2)
LA=(Q1+Q8)/2
LD=Q8−Q1
L1=LA−3LD/8
L2=LA−LD/4
L3=LA−LD/8
L5=LA+LD/8
L6=LA+LD/4
L7=LA+3LD/8

Here, Q1 equation expresses obtaining the average value of the pixels with the intensity equal to or greater than Lmin and equal to or less than P1, and Q8 equation describes obtaining the average value of pixels with the intensity equal to or less than Lmax and greater than P2.

After successively obtaining the values P1, P2, Q1, Q8, LA, LD, L1–L3 and L5–L7 in this way, the fixed length coding circuit 5 places n=1 and m=1 (steps ST14 and ST15), and decides as to whether the signal intensity (referred to as a "pixel value" from now on) Xmn of the pixel address (m,n) (that is, X11 in the present case) is equal to or less than L1 (step ST16).

If the pixel value X11 is equal to or less than L1, the fixed length coding circuit 5 places the quantization level φ ijk of the pixel at a binary value 000 (step ST17). Then, incrementing m by one (step ST31), the fixed length coding circuit 5 makes a decision as to whether m is equal to or less than four (step ST32). If m is equal to or less than four, the fixed length coding circuit 5 compares the pixel value of the pixel with L1, again (step ST16).

If m is greater than four, the fixed length coding circuit 5 increments n by one (step ST33), and makes a decision whether the incremented n is equal to or less than four (step ST34). If n is equal to or less than four, the fixed length coding circuit 5 compares the pixel value of the pixel with L1 again (step ST16).

If the pixel value X11 is greater than L1, the fixed length coding circuit 5 decides whether it is equal to or less than L2 (step ST18). If the pixel value Xmn is equal to or less than L2, the fixed length coding circuit 5 sets the quantization level φ ijk of the pixel at a binary value 001 (step ST19). Then, incrementing m by one (step ST31), the fixed length coding circuit 5 makes a decision as to whether m is equal to or less than four (step ST32). If m is equal to or less than four, the fixed length coding circuit 5 compares the pixel value of the pixel with L1, again (step ST16). If m is greater than four, the fixed length coding circuit 5 increments n by one (step ST33), and makes a decision whether the incremented n is equal to or less than four (step ST34). If n is equal to or less than four, the fixed length coding circuit 5 compares the pixel value of the pixel with L1 again (step ST16).

Thus, the fixed length coding circuit 5 decides the division L1–L2, L2–L3, L3–LA, LA–L5, L5–L6 or L6–L7, to which the pixel value belongs (steps ST16, ST18, ST20, ST22, ST24, ST26 and ST28), and assigns to the pixel one of the quantization levels φ ijk=000, 001, 010, 011, 100, 101, 110 and 111 (steps ST17, ST19, ST21, ST23, ST25, ST27 and ST29).

The coding is completed by thus assigning the quantization levels to all the pixels in the unit block. The coded data of the unit block consist of LA, LD and φ ijk of respective pixels.

The foregoing process is iterated by the number of the unit blocks in the entire image.

The luminance level of the entire image can be obtained by a small amount of calculations by integrating the average levels LA of the fixed length coded data of the individual unit blocks obtained through the fixed length coding by the fixed length coding circuit 5. This is because the average levels LA each amount to the information obtained by averaging the image signal intensity of all the 16 pixels in the unit block, which means that the accumulation processing of the 16 pixels has been completed, and hence the integrating processing can be reduce by a factor of 16. The system controller 18 obtains the luminance level of the image by integrating the average levels LA, and controls the driver circuit 17 and analog signal processing circuit 2 to achieve an intended luminance level.

The fixed length coding circuit 5 stores the fixed length coded data in the coded image memory 6. To reproduce the image, the fixed length decoding circuit 7 reads the fixed length coded data stored in the coded image memory 6, and carries out the fixed length decoding of the data. Subsequently, the signal processing circuit 9 performs on the decoded data the pixel interpolation, the gray level correction, the gamma correction and the like, and stores the data into the frame memory 10. When displaying the image, the display unit 12 reads the image signals from the frame memory 10, and displays the image. To store the data in the secondary storage 13, the variable length coding circuit 11 carries out the variable length coding of the data, and stores the data in the secondary storage 13.

As described above, the present embodiment 1 can obtain the luminance level of the entire image by a small amount of calculations, thus offering an advantage of being able to perform real time exposure control with ease.

Embodiment 2

Figure 6:
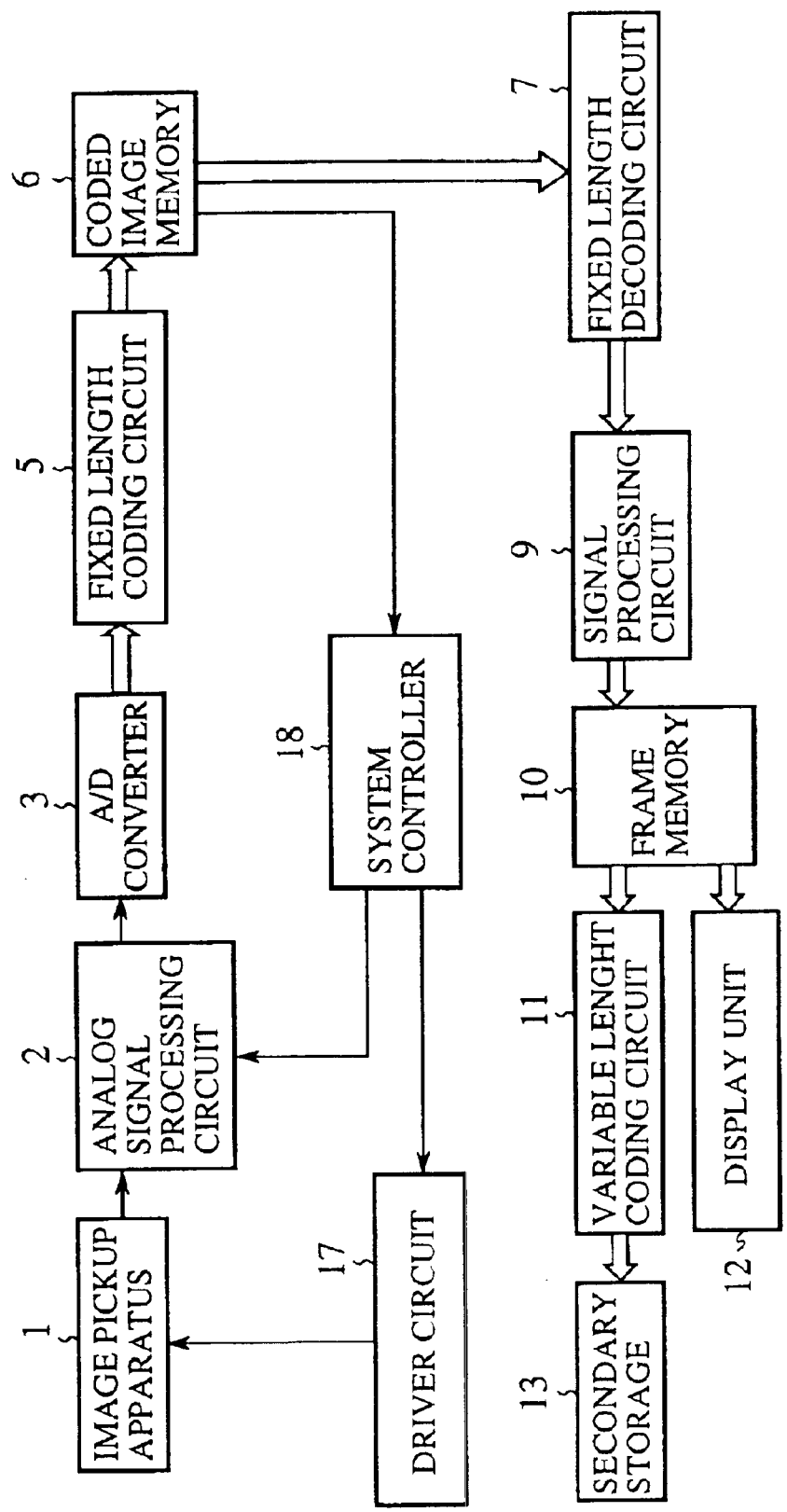
FIG. 6 is a block diagram showing an embodiment 2 of the image processing unit in accordance with the present invention.

FIG. 6 is a block diagram showing an embodiment 2 of the image processing unit in accordance with the present invention, in which the same reference numerals designate the same components as those of the foregoing embodiment 1 as shown in FIG. 1, and the description thereof is omitted here.

Next, the operation of the present embodiment 2 will be described.

In the present embodiment 2, the fixed length coded data output from the fixed length coding circuit 5 is temporarily stored in the coded image memory 6. The system controller 18 reads from the coded image memory 6 the average levels LA, and controls the exposure in accordance with the average levels LA. The exposure control scheme of the system controller 18 is the same as that of the foregoing embodiment 1.

As described above, the present embodiment 2 stores in the coded image memory 6 the coded data of the entire image. This offers an advantage of being able to achieve the exposure control which can set the integration conditions flexibly using software or the like.

Embodiment 3

Figure 7:
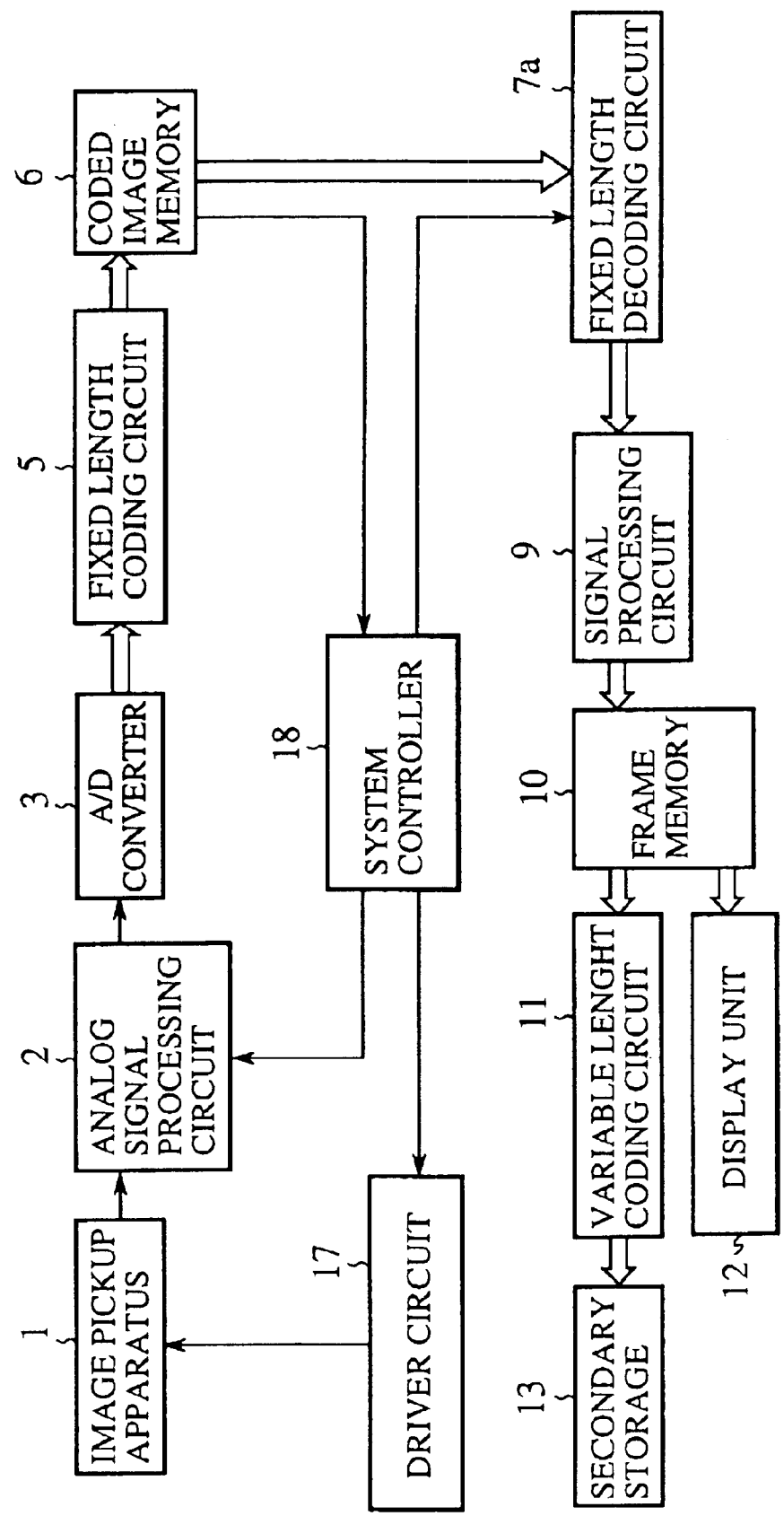
FIG. 7 is a block diagram showing an embodiment 3 of the image processing unit in accordance with the present invention.

FIG. 7 is a block diagram showing a configuration of an embodiment 3 of the image processing unit in accordance with the present invention. In FIG. 7, the same reference numerals designate the same components as those of the embodiment 1 as shown in FIG. 1, and the description thereof is omitted here. In FIG. 7, the reference numeral 7a designates a fixed length decoding circuit for carrying out decoding with a gain correction function.

When capturing pictures under fluorescent lamps or shooting moving subject, the pickup conditions during photometry can sometimes vary from those during picking up the image. In such a case, the image data must undergo gain correction so that the calculated luminance level of the captured image matches a predetermined level. The present embodiment 3 of the image processing unit performs such gain correction. The calculation of the luminance level of the image data can be carried out using the average levels LA of the fixed length coded data as in the embodiments 1 and 2.

Next, the operation of the present embodiment 3 will be described.

In the present embodiment 3, the fixed length coded data generated by the fixed length coding circuit 5 is temporarily stored in the coded image memory 6.

A gain correction coefficient K is given by K=S/C, where S is the predetermined luminance level, and C is the luminance level of the picked-up image data. Therefore, the luminance level of the reproduced image can be adjusted to the prescribed luminance level by multiplying all the image data acquired through the image pickup apparatus 1 by the gain correction coefficient K. In addition, the amount of calculation for the gain correction can be reduced by carrying the calculation during decoding.

Figure 8:
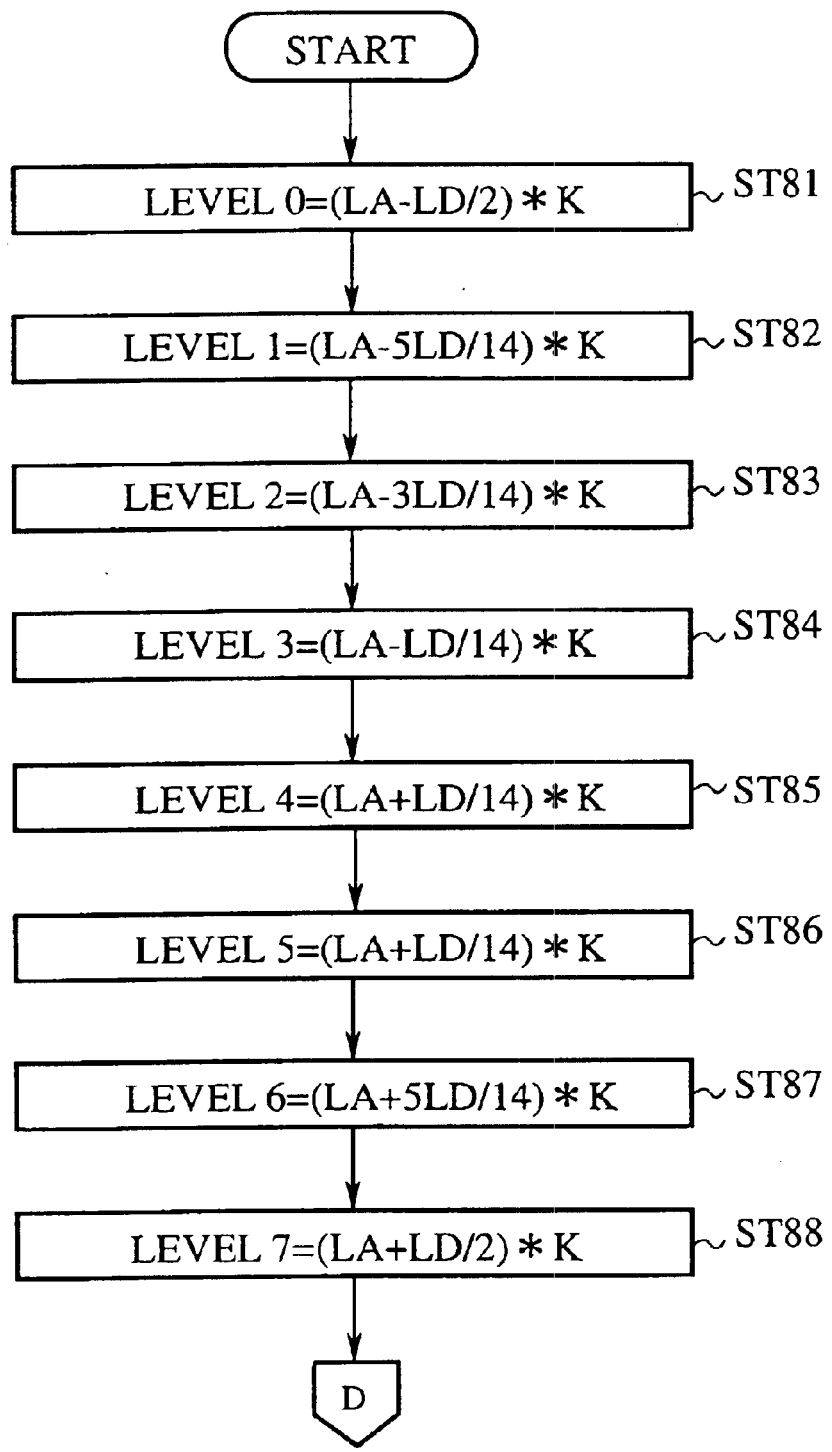
FIGS. 8 and 9 are a flowchart showing a procedure of calculation for the gain correction carried out during decoding by the embodiment 3 of the image processing unit.
Figure 9:
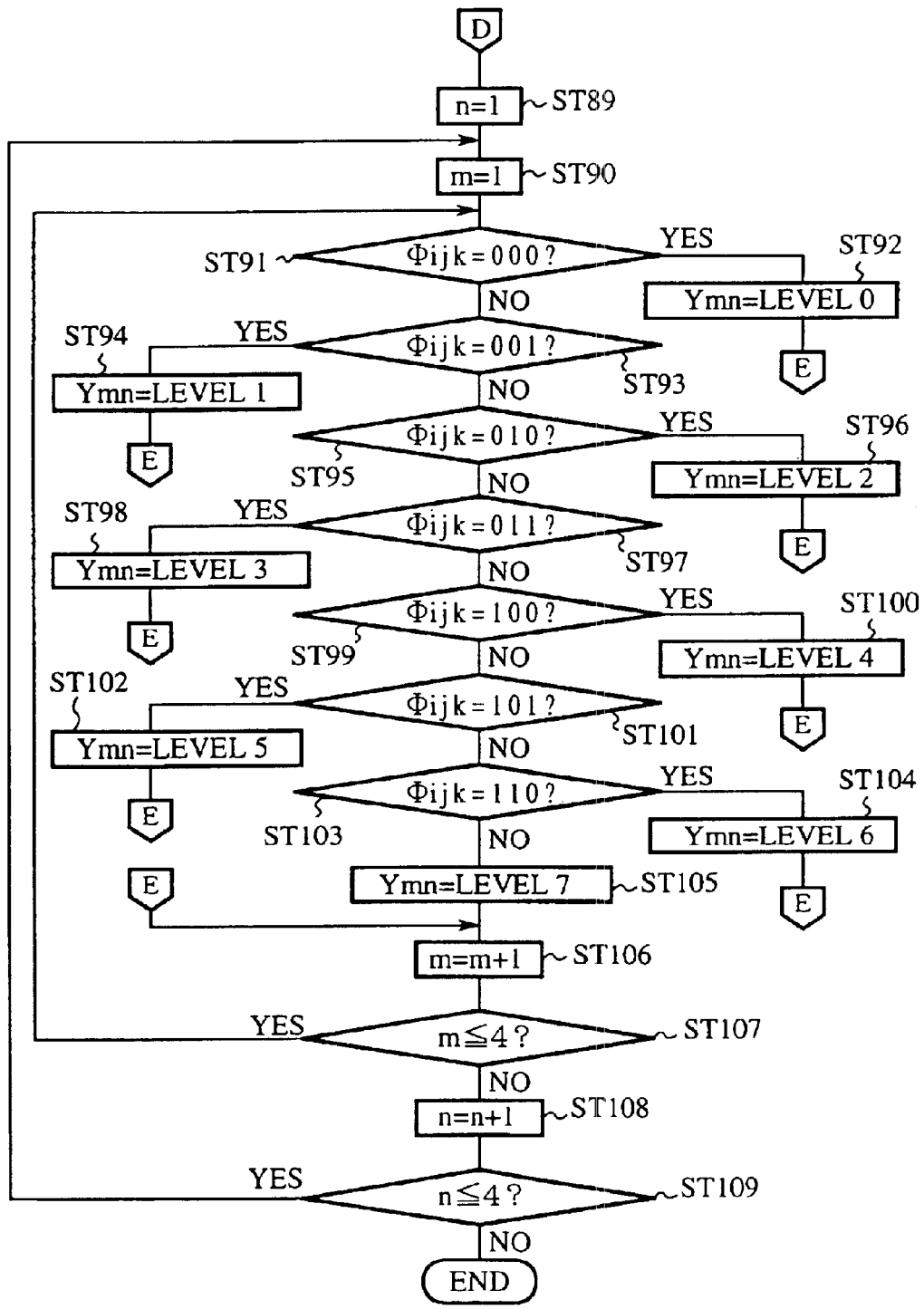

FIGS. 8 and 9 are a flowchart illustrating the gain correction calculation during the decoding. The decoding procedure by the fixed length decoding circuit 7a will now be described with reference to the flowchart of FIGS. 8 and 9.

First, the system controller 18 reads from the coded image memory 6 the average level LA and the gray scale width indicator LD of the current unit block, and supplies them to the fixed length decoding circuit 7a along with the gain correction coefficient K. Here, the gray scale width indicator LD is that of the unit blocks, which is equal to Q8–Q1.

From the average level LA, the gray scale width indicator LD and the gain correction coefficient K, the fixed length decoding circuit 7a obtains in advance decode levels LEVEL0–LEVEL7 which are multiplied by the gain correction coefficient K (step ST81–ST88).

Subsequently, the fixed length decoding circuit 7a places a vertical coordinate value n to one (step ST89), and then a horizontal coordinate value m to one (step ST90). Thus, the coordinates (1,1) are designated as an address in the unit block by the steps ST89 and ST90.

Next, the fixed length decoding circuit 7a decides the quantization level φ ijk of the designated address (steps ST91, ST93, ST95, ST97, ST99, ST101 and ST103), and assigns, in accordance with the decided quantization level φ ijk, one of the gain corrected decode levels LEVEL0–LEVEL7 as the signal intensity Ymn of the pixel (Y11, if the pixel coordinates are (1,1)) (steps ST92, ST94, ST96, ST98, ST100, ST102, ST104 and ST105).

After obtaining the signal intensity of the pixel (1,1), the fixed length decoding circuit 7a increments the position of the pixel by one in the horizontal direction (step ST106), and decodes the signal intensity of the pixel (2,1) through the same procedure (step ST91–105).

After decoding the signal intensity of the pixels in the top row in the unit block (step ST107), the fixed length decoding circuit 7a increments the coordinate in the vertical direction by one (step ST108), and decodes the signal intensity of the pixels in the next row through the same procedure (step ST90–107)

By thus decoding all the pixels in the unit blocks (steps ST90–ST109), the decoding is completed.

According to the present embodiment 3, even when the signal intensity of the 16 pixels ranges over all the eight decode levels LEVEL0–LEVEL7, for example, the calculation of the 16 pixels can be halved to eight times, offering an advantage of being able to considerably reduce the calculation amount for he gain correction.

Embodiment 4

Figure 10:
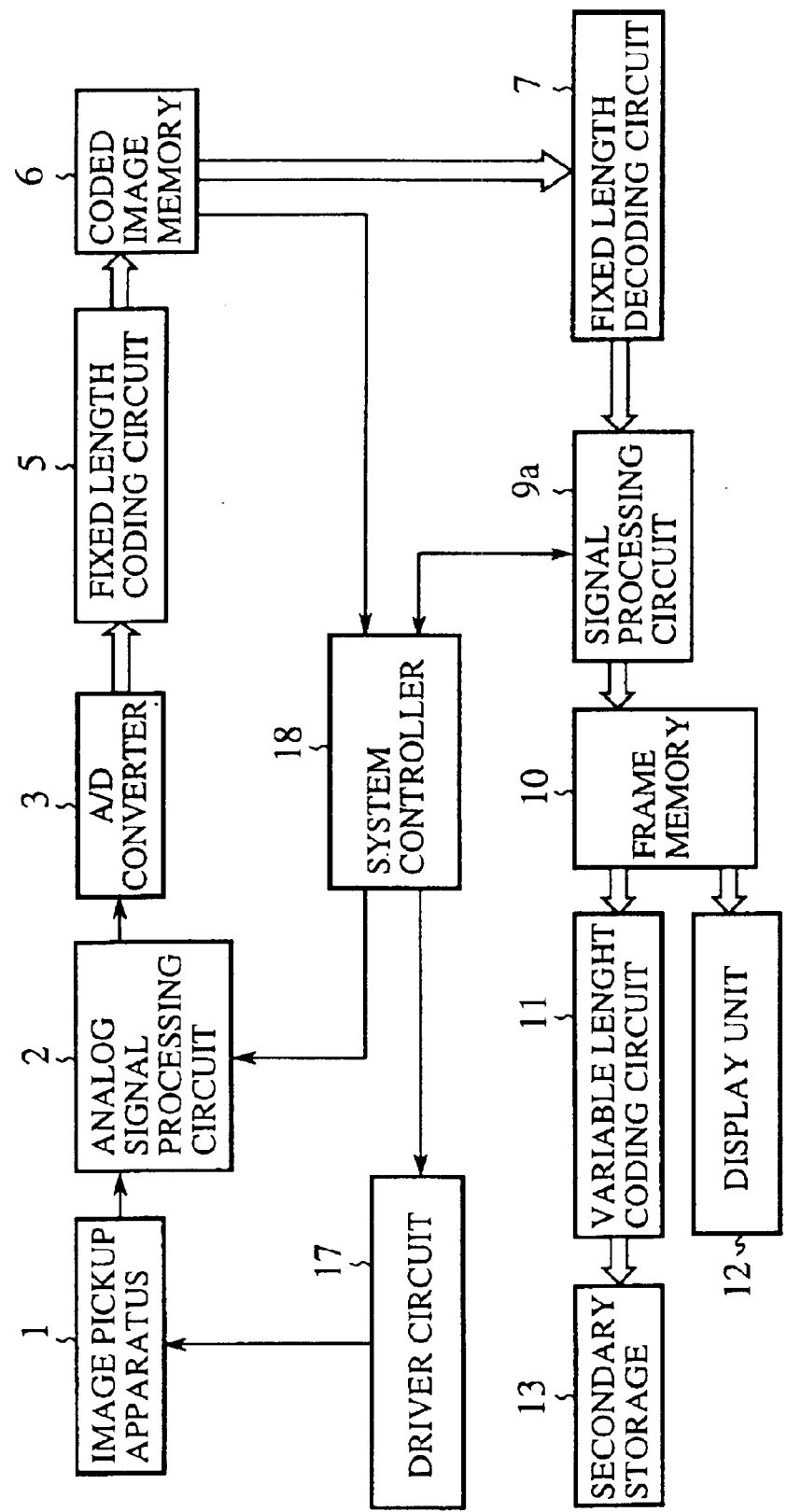
FIG. 10 is a block diagram showing an embodiment 4 of the image processing unit in accordance with the present invention.

FIG. 10 is a block diagram showing a configuration of an embodiment 4 of the image processing unit in accordance with the present invention. In FIG. 10, the same reference numerals designate the same components as those of the embodiment 1 as shown in FIG. 1, and the description thereof is omitted here. In FIG. 10, the reference numeral 9a designates a signal processing circuit having a gain correction function.

Next, the operation of the present embodiment 4 will be described.

The fixed length decoding circuit 7 reads the fixed length coded data stored in the coded image memory 6, carries out the normal fixed length decoding, and supplies the decoded image data to the signal processing circuit 9a. On the other hand, the system controller 18 reads from the coded image memory 6 the average levels LA, and supplies them to the signal processing circuit 9a. The signal processing circuit 9a carries out, in conjunction with the other signal processings, the calculation for the gain correction on the basis of the average levels LA.

According to the present embodiment 4, an advantage can be achieved of being able to control the gain correction coefficient in accordance with the data after the signal processings produced by the signal processing circuit 9a, in addition to the advantage of the foregoing embodiment 3.

Embodiment 5

Figure 11:
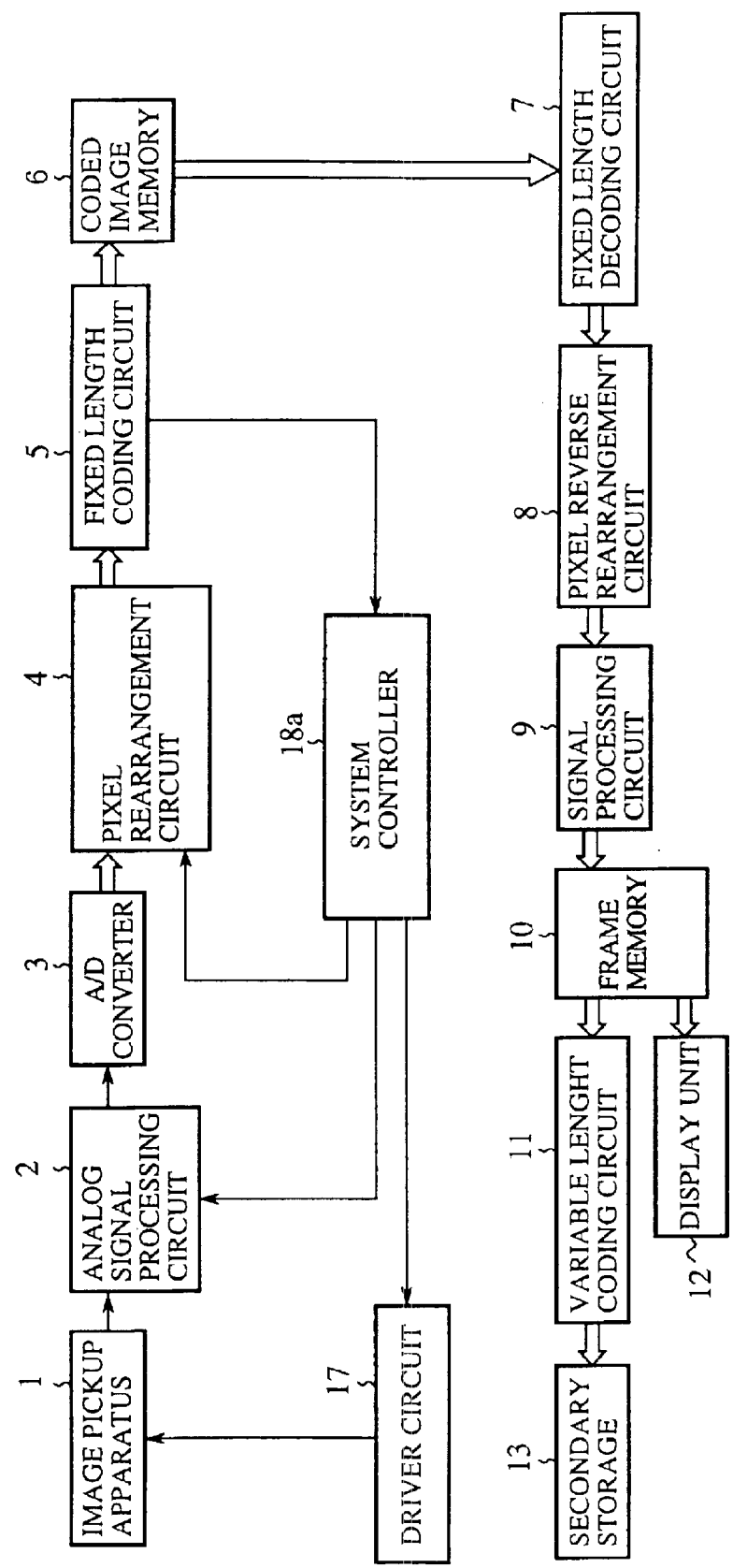
FIG. 11 is a block diagram showing an embodiment 5 of the image processing unit in accordance with the present invention.

FIG. 11 is a block diagram showing a configuration of an embodiment 5 of the image processing unit in accordance with the present invention. In FIG. 11, the same reference numerals designate the same components as those of the embodiment 1 as shown in FIG. 1, and the description thereof is omitted here. In FIG. 11, the reference numeral 4 designates a pixel rearrangement circuit that sorts the RGB color signals of pixels output from the A/D converter 3, and outputs a batch of unit blocks of respective color components for coding; B designates a reverse rearrangement circuit for carrying out reverse sorting of the pixel signals such that they are rearranged in the same order as they are read out in the scanning direction, by sorting the data decoded by the fixed length decoding circuit 7 in the order reverse to the sorting order of the pixel rearrangement circuit 4; and 18a designates a system controller for carrying out level correction control of individual color signals based on the A/D converted image signals that undergo the fixed length coding.

Next, the operation of the present embodiment 5 will be described.

The image pickup apparatus 1 captures the image of a subject, and outputs image signals corresponding to the incident light filtered by the color filters as shown in FIG. 2, pixel by pixel in the scanning direction in a dot serial manner. The color image signals are amplified by the analog signal processing circuit 2, and filtered to remove their noise components. Subsequently, they are converted into digital signals through the A/D converter 3, and are supplied to the pixel rearrangement circuit 4.

The pixel rearrangement circuit 4, alternately using two line buffers not shown, sequentially writes into a first line buffer the image data of a scanning line, and at the same time reads from a second line buffer the image data with changing the read addresses, thereby carrying out the sorting of the image data. The image data, which is rearranged by the pixel rearrangement circuit 4 in such a manner that each color component forms a batch, is converted into fixed length coded data through the fixed length coding by the fixed length coding circuit 5. The fixed length coded data is stored in the coded image memory 6.

Figure 12:
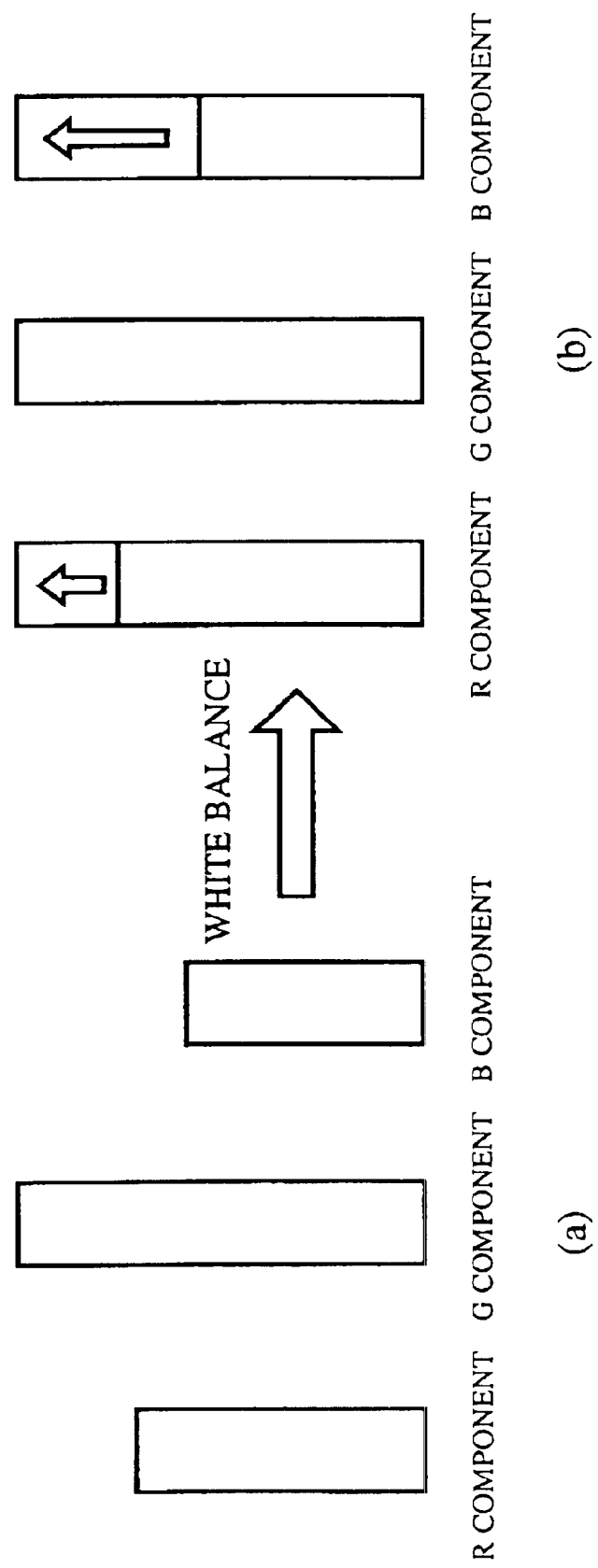
FIG. 12 is a schematic diagram illustrating a principle of a white balance processing for correcting levels of individual color signals.

Incidentally, the image signals output from the image pickup device, on which a plurality of color filters are disposed, exhibit different output level characteristics for the individual color signals because of the difference in the spectral sensitivity characteristics of the color filters. For example, when shooting an achromatic color subject with a pickup device with three RGB color filters, although the output levels of the color signals are expected to match with each other, they can differ in practice as shown in FIG. 12(a) because of the difference in the spectral sensitivity characteristics of the color filters in view of this, the system controller 18a carries out a while balance processing to correct the levels of the color signals so as to adjust them as shown in FIG. 12(b). The level correction of each color signal is based on the principle that the spectral characteristics of a common subject spreading over a wide range will become achromatic. Thus, the system controller 18a uses without change the image data as picked up in the level correction processing. In other words, if no sensitivity difference is present in the color filters when capturing individual color image signals in a particular range, the levels of the color signals are expected to match with each other. Thus, the deviation in the level is corrected as the sensitivity difference. Accordingly, the white balance processing uses, as the AE processing, the integrals of the output signals of the image pickup device.

In the present embodiment 5, the fixed length coding circuit 5 carries out fixed length coding of the data sorted by the pixel rearrangement circuit 4 such that the color signal components in each unit block become the same color, thereby achieving the fixed length coding for each color signal. As a result, the average level LA can be extracted from each color signal. For example, when G has the highest sensitivity in the three colors, the system controller 18a calculates a level correction coefficient Kr for the R signal by Kr=SG/SR, and a level correction coefficient Kb for the B signal by Kb=SG/SB, where SR, SG and SB are integrals of the average levels LA of the R, G and B signals, respectively. Then, the RGB signal levels can be adjusted by multiplying the R and B signals in the picked-up image signals by Kr and Kb, respectively.

The present embodiment 5 implements the real-time white balance processing by carrying out the correction processing during the sorting of the pixels for bringing the same color components together into a unit block. The calculation of the level correction coefficients Kr and Kb can be achieved by recursively correcting the already corrected signals with providing a delay, or can be completed at once by calculating them from the uncorrected image signals to terminate the white balance processing in a short time. Besides, it is not necessary to match the levels of the RGB signals. For example, they can be provided with level differences as needed such as correcting the color temperature of a light source.

Although the reproduction method of the image signals of the present embodiment 5 is basically the same as that of the foregoing embodiments 1–3, since the present embodiment 5 carries out the fixed length coding after the pixel sorting, the pixel reverse rearrangement circuit 8 performs the sorting opposite to that of the pixel rearrangement circuit 4 on the data decoded by the fixed length decoding circuit 7 so that the pixel signals are rearranged in the same order as the pixel signals read out in the scanning direction. The subsequent operation is the same as that of the embodiments 1–3.

Thus, the present embodiment 5 offers an advantage of being able to reduce, by extracting average levels LA of individual signals, the amount of calculation for obtaining the level correction coefficients of the individual color signals.

Embodiment 6

Figure 13:
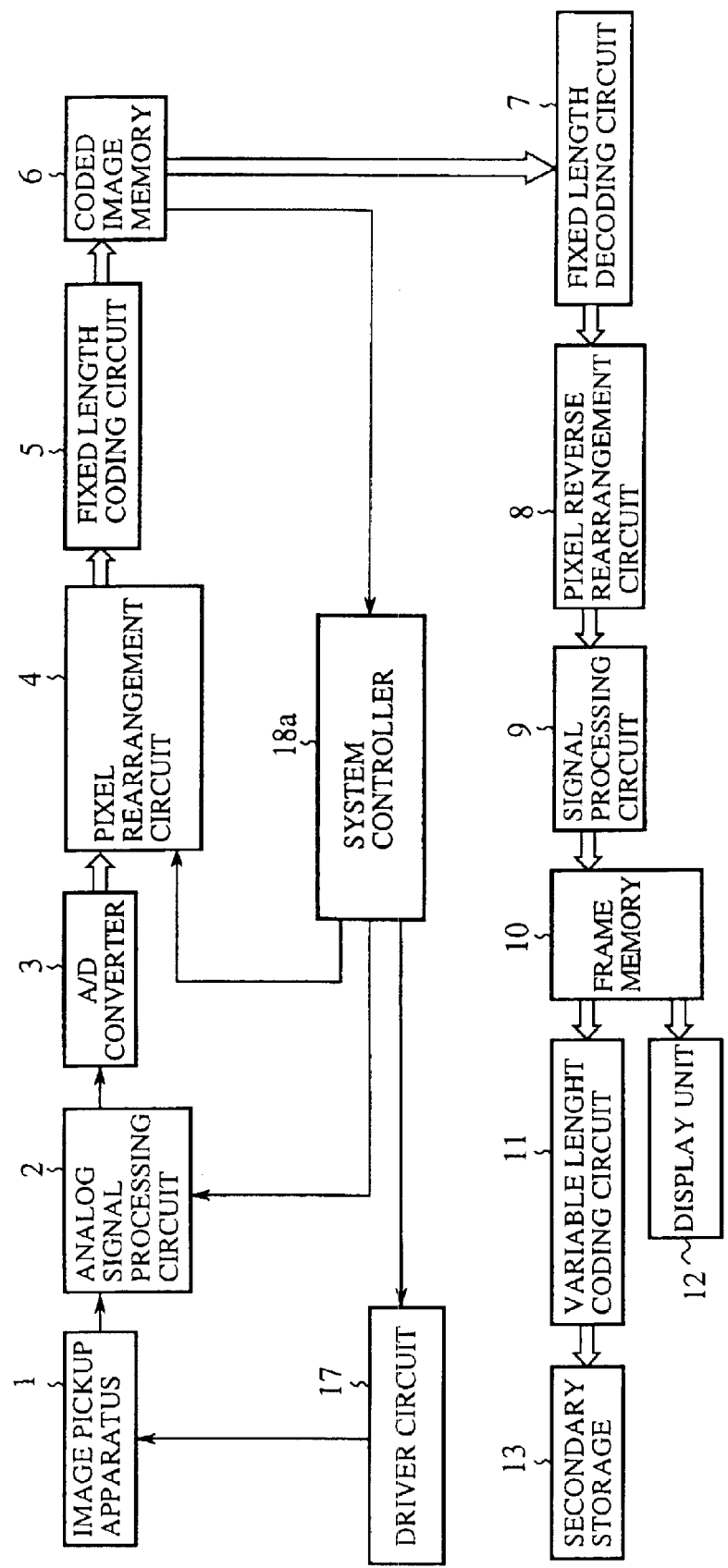
FIG. 13 is a block diagram showing an embodiment 6 of the image processing unit in accordance with the present invention.

FIG. 13 is a block diagram showing an embodiment 6 of the image processing unit in accordance with the present invention. In FIG. 13, the same reference numerals designate the same components as those of the embodiment 5 as shown in FIG. 11, and the description thereof is omitted here. In the present embodiment 6, the system controller 18a reads out the fixed length coded data stored in the coded image memory 6 to carry out the level correction of each color signal.

Next, the operation of the present embodiment 6 will be described.

In the present embodiment 6, the data, which undergoes the pixel sorting by the pixel rearrangement circuit 4 and the fixed length coding by the fixed length coding circuit 5, is temporarily stored in the coded image memory 6 as the fixed length coded data. The system controller 18a reads out the average levels LA of the individual color signals stored in the coded image memory 6, and carried out the white balance processing as in the foregoing embodiment 5.

Thus, since the present embodiment 6 stores in the coded image memory 6 the coded data associated with the entire screen, it has an advantage of being able to implement a processing that can set the integration conditions flexibly by software or the like, for example.

Embodiment 7

Figure 14:
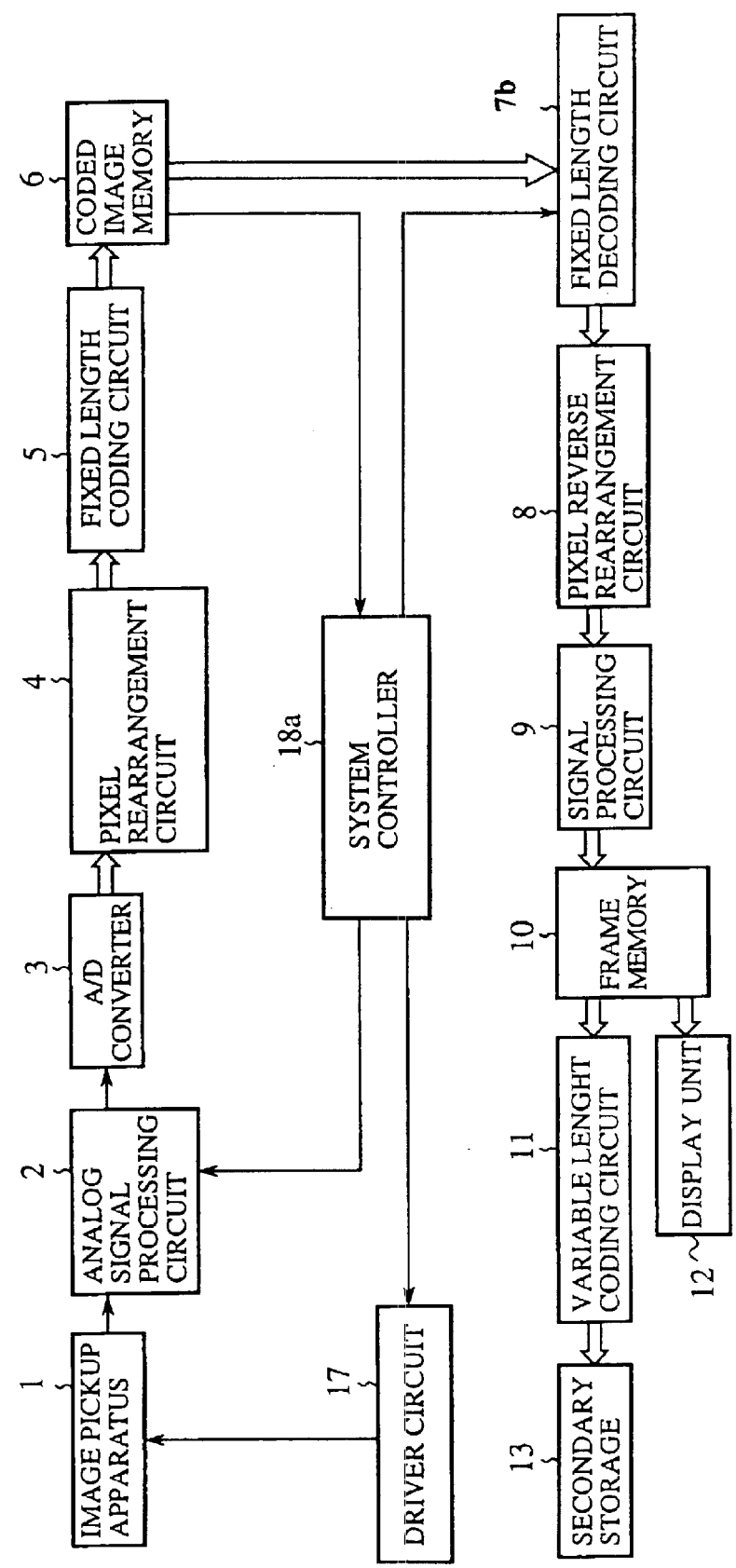
FIG. 14 is a block diagram showing an embodiment 7 of the image processing unit in accordance with the present invention.

FIG. 14 is a block diagram showing an embodiment 7 of the image processing unit in accordance with the present invention. In FIG. 14, the same reference numerals designate the same components as those of the embodiment 6 as shown in FIG. 13, and the description thereof is omitted here. In FIG. 14, the reference numeral 7b designates a fixed length decoding circuit that can achieve decoding in conjunction with the level correction of the individual color signals.

Next, the operation of the present embodiment 7 will be described.

In the present embodiment 7, the data, which is subjected to the sorting by the pixel rearrangement circuit 4 and to the fixed length coding by the fixed length coding circuit 5, is temporarily stored in the coded image memory 6. The system controller 18a reads from the coded image memory 6 the average levels LA, and supplies them to the fixed length decoding circuit 7b with the level correction coefficients Kr and Kb. The fixed length decoding circuit 7b carries out the level correction of individual color signals on the basis of the average levels LA, and the level correction coefficients Kr and Kb, followed by the normal fixed length decoding.

Thus, the present embodiment 7 has an advantage of being able to reduce the amount of the calculation for the level correction.

Embodiment 8

Figure 15:
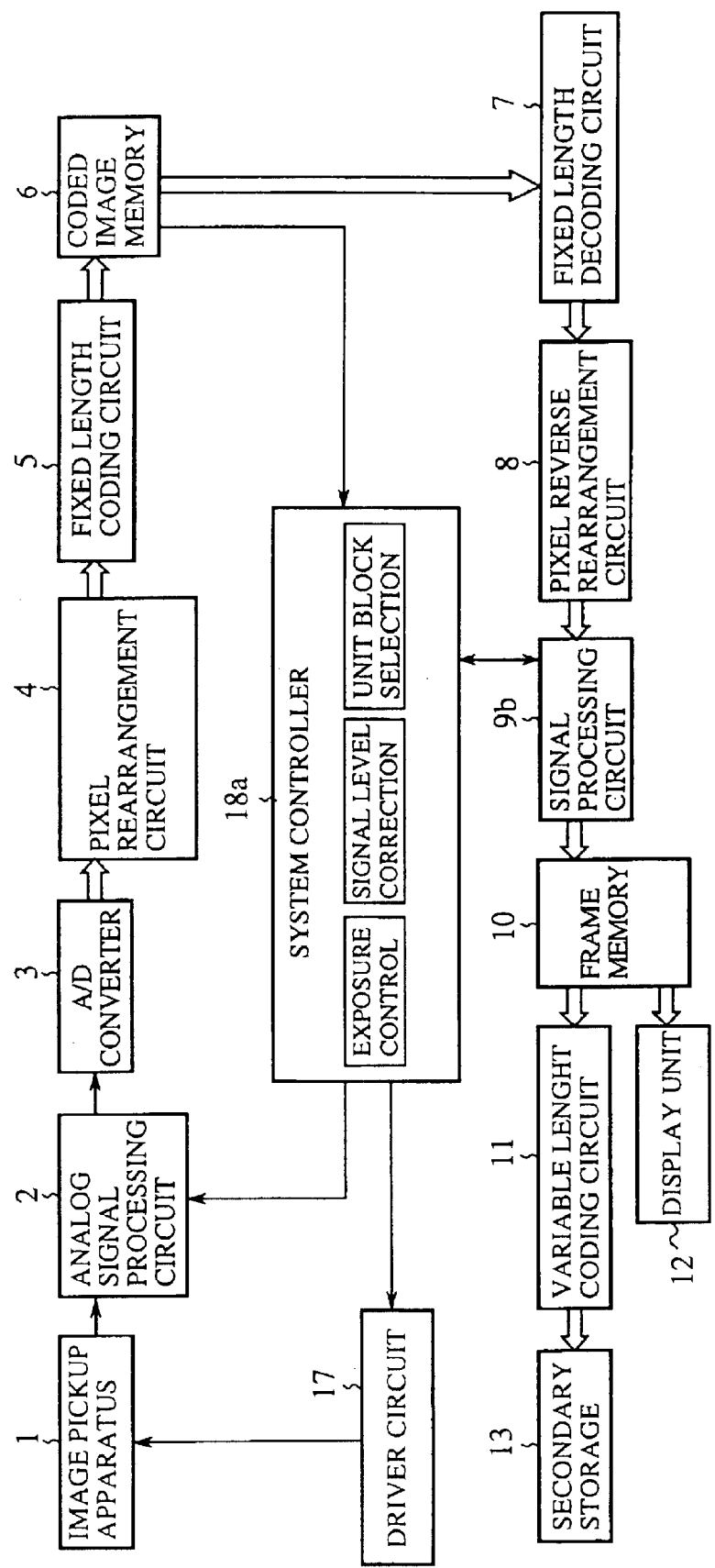
FIG. 15 is a block diagram showing an embodiment 8 of the image processing unit in accordance with the present invention.
Figure 16:
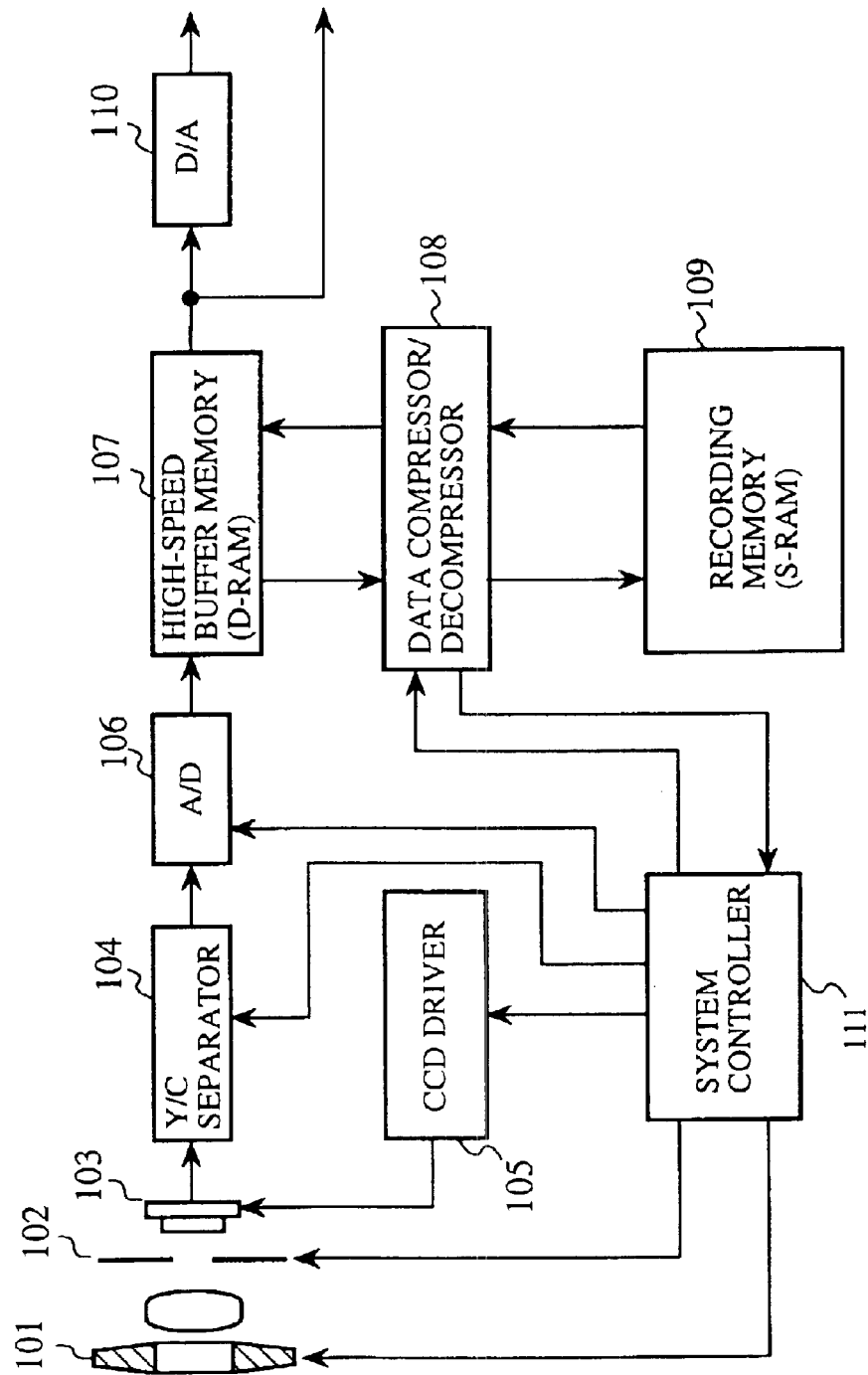
FIG. 16 is a block diagram showing a digital still video camera disclosed in Japanese patent application laid-open No. 4-298170/1992.

FIG. 15 is a block diagram showing an embodiment 8 of the image processing unit in accordance with the present invention. In FIG. 15, the same reference numerals designate the same components as those of the embodiment 6 as shown in FIG. 13, and the description thereof is omitted here. In FIG. 15, the reference numeral 9b designates a signal processor for carrying out the level correction of respective color signals after the normal signal processing.

Next, the operation of the present embodiment 8 will be described.

In the present embodiment 8, the fixed length decoding circuit 7 reads from the coded image memory 6 the fixed length coded data, and carries out the fixed length decoding thereof, and the pixel reverse rearrangement circuit 8 rearranges the image data, which undergoes the fixed length decoding, in the same order as the image data read in the direction of the scanning line. Subsequently, the signal processing circuit 9b carries out the normal signal processing such as the pixel interpolation, the gray level correction and the gamma correction, followed by the level correction of the color signals, and supplies the image data to the frame memory 10. The subsequent operation is the same as that of the foregoing embodiments as described above.

Thus, the present embodiment 8 has an advantage of being able to control the level correction coefficients by referring to the data after the signal processing.

Incidentally, the system controller 18a can have a function to change the number of unit blocks to be processed, thereby limiting the amount of the calculation or the calculation duration.

Furthermore, the system controller 18a can have a function to arbitrary set the location of the unit blocks to be processed, thereby neglecting from consideration the peripheries of the screen at which light amount can be insufficient due to lens characteristics.

Moreover, the system controller 18a can have a function to arbitrary set the range of levels of the unit blocks to be processed in order to use only signals in a specified luminance range, thereby avoiding using low luminance level signals susceptible to noise or high luminance level signals with different saturation characteristics.

What is claimed is:

1. An image processing unit, comprising:

an A/D converter for carrying out A/D conversion of image signals output from an image pickup apparatus that picks up an image an converts it into electrical signals, and for outputting A/D converted image signals as image data;

a fixed length coding circuit for dividing the image data into unit blocks, each comprising a predetermined number of pixels, and for coding the pixels in each unit block after obtaining an average level of the pixels in the unit block, wherein a length of the code output from the fixed length coding circuit is fixed and the code is non-orthogonal to the image data; and an exposure controller for calculating a luminance level of a whole set of pixel data in the unit blocks by integrating the average levels of the unit blocks, and for controlling exposure of the image pickup apparatus such that the luminance level of the image data matches a predetermined level.

2. The image processing unit according to claim 1, further comprising a coded image memory for storing fixed length coded data output from the fixed length coding circuit, the fixed length coded data including the average levels of the unit blocks.

3. The image processing unit according to claim 2, further comprising a fixed length decoding circuit for reading from said coded image memory the fixed length coded data, for calculating a luminance level of the image data from the average levels, and for carrying out fixed length decoding of the fixed length coded data with performing gain correction for adjusting the luminance level of the image data to a predetermined level.

4. The image processing unit according to claim 2, further comprising:

a fixed length decoding circuit for reading from said coded image memory the fixed length coded data, and for carrying out fixed length decoding of the fixed length coded data; and a signal processor for carrying out, using the average levels, gain correction of image data output from said fixed length decoding circuit.

5. The image processing unit according to claim 1, further comprising selecting means for selecting a number of the unit blocks.

6. The image processing unit according to claim 1, further comprising selecting means for selecting a location of the unit blocks.

7. The image processing unit according to claim 1, further comprising selecting means for selecting the unit blocks in accordance with their average levels.

8. The image processing unit according to claim 1, wherein the length of the code output from the fixed length coding circuit is fixed for each unit block.

9. The image processing unit according to claim 8, comprising:

a fixed length decoding circuit for decoding the image data by decoding each fixed length code for each unit block coded by the fixed length coding circuit; and a signal processing circuit for performing signal processing on the decoded image data.

10. An image processing unit, comprising:

an A/D converter for carrying out A/D conversion of image signals output from an image pickup device that picks up an image an converts it into electrical signals including a plurality of color components, and for outputting A/D converted image signals as image data;

a pixel rearrangement circuit for sorting the image data output from said A/D converter such that each color component is arranged in a unit block, each of which comprises a predetermined number of pixels; and a fixed length coding circuit for for coding the pixels in each unit block after obtaining an average level of the pixels in the unit block, wherein a length of the code output from the fixed length coding circuit is fixed and the code is non-orthogonal to the image data.

11. The image processing unit according to claim 10, further comprising an exposure controller for calculating a luminance level of a whole set of pixel data in the unit blocks by integrating the average levels of the unit blocks, and for controlling exposure of the image pickup apparatus such that the luminance level of the image data matches a predetermined level.

12. The image processing unit according to claim 10, further comprising signal level correction means for correcting, using the average levels of the unit blocks, relative signal levels of the respective color components.

13. The image processing unit according to claim 12, further comprising a coded image memory for storing fixed length coded data including the average level of each unit block, the fixed length coded data being output from the fixed length coding circuit.

14. The image processing unit according to claim 13, wherein said signal level correction means reads from said coded image memory the average levels, calculates from the average levels luminance levels of the pixel data in the unit blocks of the respective color components, and corrects signal levels of the color components such that the luminance levels of the color components match with each other.

15. The image processing unit according to claim 13, further comprising a fixed length decoding circuit for reading from said coded image memory the fixed length coded data, and for carrying out fixed length decoding of the fixed length coded data with performing gain correction for adjusting, for each color component, the luminance level of the image data to a predetermined level by using the average levels.

16. The image processing unit according to claim 13, further comprising:

a fixed length decoding circuit for reading from said coded image memory the fixed length coded data, and for carrying out fixed length decoding of the fixed length coded data; and a signal processor for carrying out, for each color component, signal level correction of image data output from said fixed length decoding circuit by using the average levels.

17. The image processing unit according to claim 12, further comprising selecting means for selecting a number of the unit blocks.

18. The image processing unit according to claim 12, further comprising selecting means for selecting a location of the unit blocks.

19. The image processing unit according to claim 12, further comprising selecting means for selecting the unit blocks in accordance with their average levels.

20. The image processing unit according to claim 10, wherein the length of the code output from the fixed length coding circuit is fixed for each unit block.

21. The image processing unit according to claim 20, comprising:

a fixed length decoding circuit for decoding the image data by decoding each fixed length code for each unit block coded by the fixed length coding circuit; and a signal processing circuit for performing signal processing on the decoded image data.

22. An image processing method of reproducing a picked-up still image, said method comprising the steps of:

carrying out A/D conversion of image signals output from an image pickup apparatus, and for outputting A/D converted image signals as image data;

dividing the image data into unit blocks, each comprising a predetermined number of pixels, and coding the pixels in each unit block after obtaining an average level of the pixels in the unit block, wherein a length of the code is fixed and the code is non-orthogonal to the image data; and calculating a luminance level of a whole set of pixel data in the unit blocks by integrating the average levels of the unit blocks, and controlling exposure of the image pickup apparatus such that the luminance level of the image data matches a predetermined level.

23. The image processing method according to claim 22, wherein the length of the code is fixed for each unit block.

24. The image processing method according to claim 23, comprising:

decoding the image data by decoding each fixed length code for each unit block; and signal processing on the decoded image data.

25. An image processing system, comprising:

an A/D converter configured to convert analog image signals into corresponding digital image data; and a fixed length coding circuit configured to receive the digital image data as a plurality of blocks and output a code corresponding to each block, wherein a size of the blocks is predetermined and a length of the code output for each block is fixed and the code is non-orthogonal to the image data, and wherein the code is such that pixels of each block are coded after obtaining an average level of the pixels in the block.

26. The image processing system of claim 25, wherein the code output by the fixed length coding circuit includes at least one of average intensity value of pixels within the block, grey scale indicator of the block, and quantization levels of the pixels within the block.

27. The image processing system of claim 26, further comprising a pixel rearrangement circuit configured to sort each color component of the pixels into the plurality of blocks and wherein the code fixed length coding circuit includes at least one of average intensity values of each color component and quantization levels of the color components of the pixels.

28. The image processing system of claim 26, further comprising a system controller is configured to control an exposure of an image pickup apparatus based on the code.

29. The image processing system of claim 28, wherein the system controller is configured to calculate a luminance level of the digital image data based on the average intensity values of the plurality of blocks, wherein the system controller is configured to control the exposure of the image pickup apparatus based on the calculated luminance level.

30. A method for processing images, comprising:

converting analog image signals into corresponding digital image data;

dividing the digital image data into a plurality of blocks, wherein a size of the blocks is predetermined; and coding each block of the digital image data, wherein a length of the code is fixed and the code is non-orthogonal to the image data, and wherein the code is such that pixels of each block are coded after obtaining an average level of the pixels in the block.

31. The method of claim 30, wherein the step of coding each block comprises at least one of:

calculating average intensity value of pixels of the block, calculating a grey scale indicator of the block; and determining quantization level of each pixel of the block.

32. The method of claim 31, wherein the step of calculating the average intensity value comprises:

determining maximum and minimum intensity pixel values of the block;

determining a predetermined number of intensity division ranges based on the maximum and minimum intensity pixel values;

determining an average intensity pixel value of a highest division range and an average intensity pixel value of a lowest division range; and adding the average intensity pixel values of the highest and lowest division ranges and dividing by two.

33. The method of claim 31, wherein the step of calculating the grey scale indicator comprises:

determining maximum and minimum intensity pixel values of the block;

determining a predetermined number of intensity division ranges based on the maximum and minimum intensity pixel values;

determining an average intensity pixel value of a highest division range and an average intensity pixel value of a lowest division range; and substracting the average intensity pixel value of the lowest division range from the average intensity pixel value of the highest division range.

34. The method of claim 31, wherein the step of calculating the determining quantization level of each pixel comprises:

determining maximum and minimum intensity pixel values of the block;

determining a predetermined number of intensity division ranges based on the maximum and minimum intensity pixel values; and for each pixel, determining which intensity division range the pixel belongs.

35. The method of claim 30, further comprising sorting each color component of the pixels into the plurality of blocks and wherein the code fixed length coding circuit includes at least one of average intensity values of each color component and quantization levels of the color components of the pixels.

36. The method of claim 31, further comprising:

calculating a luminance level of the digital image data based on the average intensity values of the plurality of blocks; and controlling an exposure of the image pickup apparatus based on the calculated luminance level.

37. The method of claim 36, further comprising:

calculating a gain correction coefficient needed to correct the luminance level of the digital image data to a predetermined luminance level; and adjusting the luminance level of the digital image data based on the gain correction coefficient.

38. The method according to claim 30, wherein the length of the code is fixed for each unit block.

39. The image processing method according to claim 38, comprising:

decoding the image data by decoding each fixed length code for each unit block; and signal processing on the decoded image data.

40. An image processing unit, comprising:

a fixed length decoding circuit for decoding an image data that has been coded by dividing the image data into a plurality of unit blocks and encoding each unit block, wherein each unit block comprises a predetermined number of pixels, wherein a length of code for each unit block is fixed and the code is non-orthogonal to the image data, and wherein the code is such that pixels of each unit block are coded after obtaining an average level of the pixels in the block; and a signal processing circuit for performing signal processing on the image data decoded by fixed length decoding circuit.

* * * * *